(12) United States Patent
Kinoshita et al.

(10) Patent No.: US 6,552,258 B2
(45) Date of Patent: Apr. 22, 2003

(54) SOLAR CELL MODULE

(75) Inventors: Toshihiro Kinoshita, Katano (JP); Yukihiro Yoshimine, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/948,351

(22) Filed: Sep. 7, 2001

(65) Prior Publication Data

US 2002/0053360 A1 May 9, 2002

(30) Foreign Application Priority Data

Sep. 11, 2000 (JP) .................................... 2000-275523

(51) Int. Cl.[7] .............................................. H01L 31/048
(52) U.S. Cl. ...................... 136/251; 136/244; 136/291; 136/256; 257/433
(58) Field of Search ................................ 136/251, 244, 136/291, 256; 257/433

(56) References Cited

U.S. PATENT DOCUMENTS

| | | | | |
|---|---|---|---|---|
| 5,733,382 A | * | 3/1998 | Hanoka | 136/251 |
| 5,741,370 A | * | 4/1998 | Hanoka | 136/251 |
| 6,034,323 A | * | 3/2000 | Yamada et al. | 136/259 |
| 6,288,326 B1 | * | 9/2001 | Hayashi et al. | 136/251 |
| 6,323,416 B1 | * | 11/2001 | Komori et al. | 136/259 |
| 6,384,318 B1 | * | 5/2002 | Nomura | 136/256 |
| 2001/0054436 A1 | * | 12/2001 | Mukai et al. | 136/256 |

* cited by examiner

*Primary Examiner*—Alan Diamond
(74) *Attorney, Agent, or Firm*—Darby & Darby

(57) ABSTRACT

In a solar cell module constructed by sealing a plurality solar cell elements between a sheet-like substrate and a sheet-like light transmitting member with a seal layer formed of a synthetic resin, at least a part of the end faces of the light transmitting member is covered with the synthetic resin constituting the seal layer. The edges of the substrate are provided with raised sections raised toward the light transmitting member side, and the voids between the raised sections and the end faces of the light transmitting member are filled with the synthetic resin. Both edges of the substrate are provided with engagement sections that come into engagement with adjacent other solar cell modules, respectively, and the raised sections are formed on the edges having the engagement sections. The raised sections have a height equal to or more than the thickness of the seal layer.

7 Claims, 9 Drawing Sheets

SOLAR CELL MODULE

BACKGROUND OF THE INVENTION

The present invention relates to a solar cell module for use in a photovoltaic power generation system, and more particularly relates to a solar cell module having a function of preventing a lowering of reliability due to water infiltration or separation.

FIG. 1 is a light-incident side plan view showing the structure of a conventional solar cell module; FIG. 2 is a cross section cut along the II—II line of FIG. 1; and FIG. 3 is a cross section cut along the III—III line of FIG. 1.

In these figures, numeral 2 is a sheet-like substrate formed of a steel plate, and this substrate 2 has, on its both edges, engagement sections 2a and 2b to be engaged with adjacent other solar cell modules. A seal layer 3 that seals several to several tens pieces of crystalline, amorphous or other type of solar cell elements 3a, which are arranged on the same plane and wired in series or in parallel, to protect them is layered on the substrate 2, and a sheet-like light transmitting member 1 formed of a tempered glass material capable of transmitting light is layered on the seal layer 3, thereby constructing a solar cell module. The seal layer 3 is, formed of a synthetic resin such as PVB (polyvinyl butyral) and EVA (ethylene vinyl acetate).

The area of the substrate 2 is larger than the area of a layered body 4 constituted by layering the light transmitting member 1 and the seal layer 3. The engagement section 2a on one edge of the substrate 2 is formed by bending one edge of the substrate 2 upward and further bending it in a shape corresponding to an engagement section of an adjacent solar cell module, not shown, for example, in the shape of a square bracket with its opening facing the center side. Meanwhile, the engagement section 2b on the other edge of the substrate 2 is formed by bending the other edge of the substrate 2 downward and further bending it in a shape corresponding to an engagement section of other adjacent solar cell module, not shown, for example, by bending it in the direction of the substrate 2 to form an L shape.

In the event of installing solar cell modules having structures as described above on the roof of a house, for example, a plurality of solar cell modules are first arranged in a line in a girder direction on the eave side of the roof so that the engagement sections 2b are located on the eave side and then a plurality of solar cell modules are arranged in a line in a girder direction on the ridge side of the previously arranged solar cell modules so that their engagement sections 2b engage with the engagement sections 2a of the previously arranged solar cell modules, and solar cell modules are sequentially installed in the direction of the ridge. The edges, in the girder direction, of the solar cell modules installed in such a manner are provided with a decorative cover for preventing infiltration of rainwater and for improving the external appearance.

However, the conventional solar cell module does not have sufficient water-tightness and suffers from the disadvantage of a lowering of reliability of the solar cell module due to moisture infiltration from the end of the boundary between the light transmitting member 1 or the substrate 2 and the seal layer 3 and separation of the light transmitting member 1 or the substrate 2 and the seal layer 3. In particular, when the solar cell modules are installed on the roof of a house, the direction from the engagement section 2a to the engagement section 2b corresponds to the water running direction, and therefore, if there is a void between the engagement section 2a and an end face of the layered body 4, water is likely to stay in the void, resulting in a problem of facilitating moisture infiltration. In addition, there is a problem of facilitating infiltration of moisture into an end face of the layered body 4 on the engagement section 2b side due to the influence of wind.

BRIEF SUMMARY OF THE INVENTION

An object of the present invention is to provide a highly reliable solar cell module by covering at least a part of end faces of a light transmitting member with a synthetic resin constituting a seal layer so as to waterproof the boundary between the light transmitting member and the seal layer, increase the contact surface between the light transmitting member and the seal layer, and prevent separation therebetween.

Another object of the present invention is to provide a solar cell module by waterproofing the solar cell module with the use of a synthetic resin constituting the seal layer so as to prevent water infiltration at low costs without additionally preparing a waterproof agent.

Still another object of the present invention is to provide a highly reliable solar cell module by filling the voids between raised sections formed at edges of the substrate and the end faces of the light transmitting member with a synthetic resin constituting the seal layer so as to prevent direct exposure of the boundary between the seal layer and the substrate to moisture, prevent moisture infiltration and separation at the boundary, increase the contact surface between the seal layer and the substrate and prevent separation at the boundary therebetween.

Yet another object of the present invention is to provide a highly reliable solar cell module by providing raised sections at edges of the substrate having engagement sections arranged in the eave-to-ridge direction so as to reduce the void between the ridge-side end face of a layered body and the substrate and prevent water from staying in the void when water runs from the ridge side to the eave side, and further prevent infiltration of moisture into the eave-side end face of the layered body due to the influence of wind.

A further object of the present invention is to provide a highly reliable solar cell module by arranging the raised sections to have a height equal to or more than the thickness of the seal layer and filling the voids between the raised sections and the end faces of the layered body up to a height equal to or more than the thickness with a synthetic resin constituting the seal layer so as to reduce the voids between the end faces of the layered body and the substrate, prevent water from staying in the voids, prevent deformation of the seal layer formed of the synthetic resin in a transverse direction and prevent breakage of the layered body and synthetic resin.

A solar cell module according to the first aspect of the present invention is a solar cell module constructed by sealing a plurality solar cell elements between a sheet-like substrate and a sheet-like light transmitting member, with a seal layer formed of a synthetic resin, wherein at least a part of end faces of the light transmitting member is covered with the synthetic resin constituting the seal layer.

According to the first aspect, by covering at least a part of the end faces of the light transmitting member with the synthetic resin constituting the seal layer, it is possible to prevent direct exposure of the boundary between the light transmitting member and the seal layer to moisture, prevent moisture infiltration, and prevent separation at the boundary. Moreover, since the contact surface between the light transmitting member and the seal layer is increased, it is possible to prevent separation at the boundary thereof. Furthermore, since waterproofing is made using the synthetic resin constituting the seal layer, there is no need to additionally prepare a waterproof agent.

A solar cell module according to the second aspect of the present invention is based on the first aspect, wherein edges of the substrate are provided with raised sections raised toward the light transmitting member side, and voids between the raised sections and the end faces of the light transmitting member are filled with the synthetic resin.

According to the second aspect, by providing the raised sections at edges of the substrate and filling the voids between the raised sections and the end faces of the light transmitting member with the synthetic resin constituting the seal layer, it is possible to prevent direct exposure of the boundary between the seal layer and the substrate to moisture, prevent moisture infiltration, and prevent separation at the boundary. Moreover, it is possible to increase the contact surface between the seal layer and the substrate and prevent separation at the boundary thereof. Furthermore, it is possible to reduce the voids between the end faces of the layered body and the substrate and prevent water from staying in the voids. In addition, it is possible to prevent deformation of the seal layer formed of a synthetic resin in a transverse direction and prevent breakage of the layered body and synthetic resin.

A solar cell module according to the third aspect of the present invention is based on the second aspect, wherein both edges of the substrate are provided with engagement sections that come into engagement with adjacent other solar cell modules, respectively, and the raised sections are formed on the edges having the engagement sections.

According to the third aspect, in the case where the engagement sections are arranged in the eave-to-ridge direction and water runs from the ridge side to the eave side, by providing the raised sections on the edges having the engagement sections, it is possible to reduce the void between the ridge-side end face of the layered body and the substrate and prevent water from staying in the void. Furthermore, it is possible to prevent infiltration of moisture into the eave-side end face of the layered body due to the influence of wind.

A solar cell module according to the fourth aspect of the present invention is based on the second or third aspect, wherein the raised sections have a height equal to or more than a thickness of the seal layer.

According to the fourth aspect, by making the height of the raised sections equal to or more than the thickness of the seal layer and filling the voids between the raised sections and the end faces of the layered body up to a height equal to or more than the thickness with the synthetic resin constituting the seal layer, it is possible to reduce the voids between the end faces of the layered body and the substrate and prevent water from staying in the voids, and also prevent deformation of the seal layer formed of the synthetic resin in a transverse direction and prevent breakage of the layered body and synthetic resin.

The above and further objects and features of the invention will more fully be apparent from the following detailed description with accompanying drawings.

DETAILED DESCRIPTION OF THE INVENTION

The following description will explain the present invention in detail with reference to the drawings illustrating some embodiments thereof.
(First Embodiment)

Figure 1:
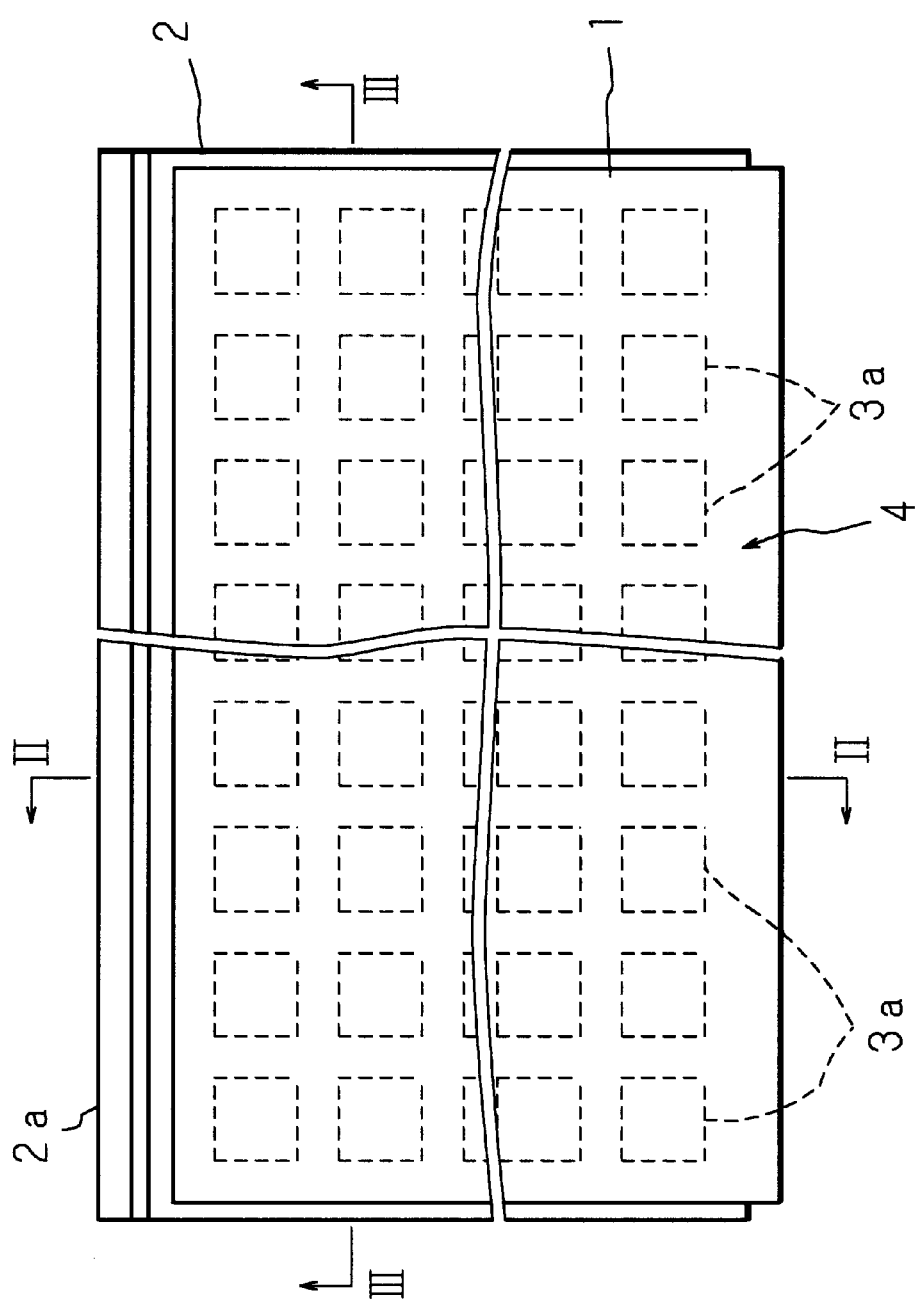
FIG. 1 is a light-incident side plan view showing the structure of a conventional solar cell module.
Figure 2:
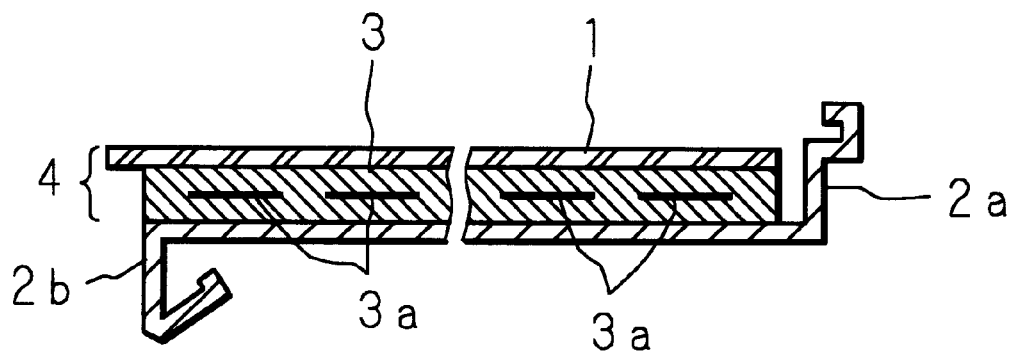
FIG. 2 is a cross section cut along the II—II line of FIG. 1.
Figure 3:
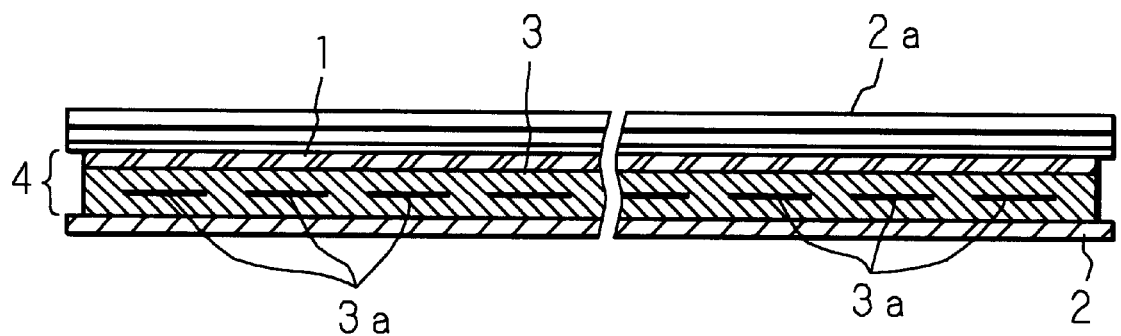
FIG. 3 is a cross section cut along the III—III line of FIG. 1.
Figure 4:
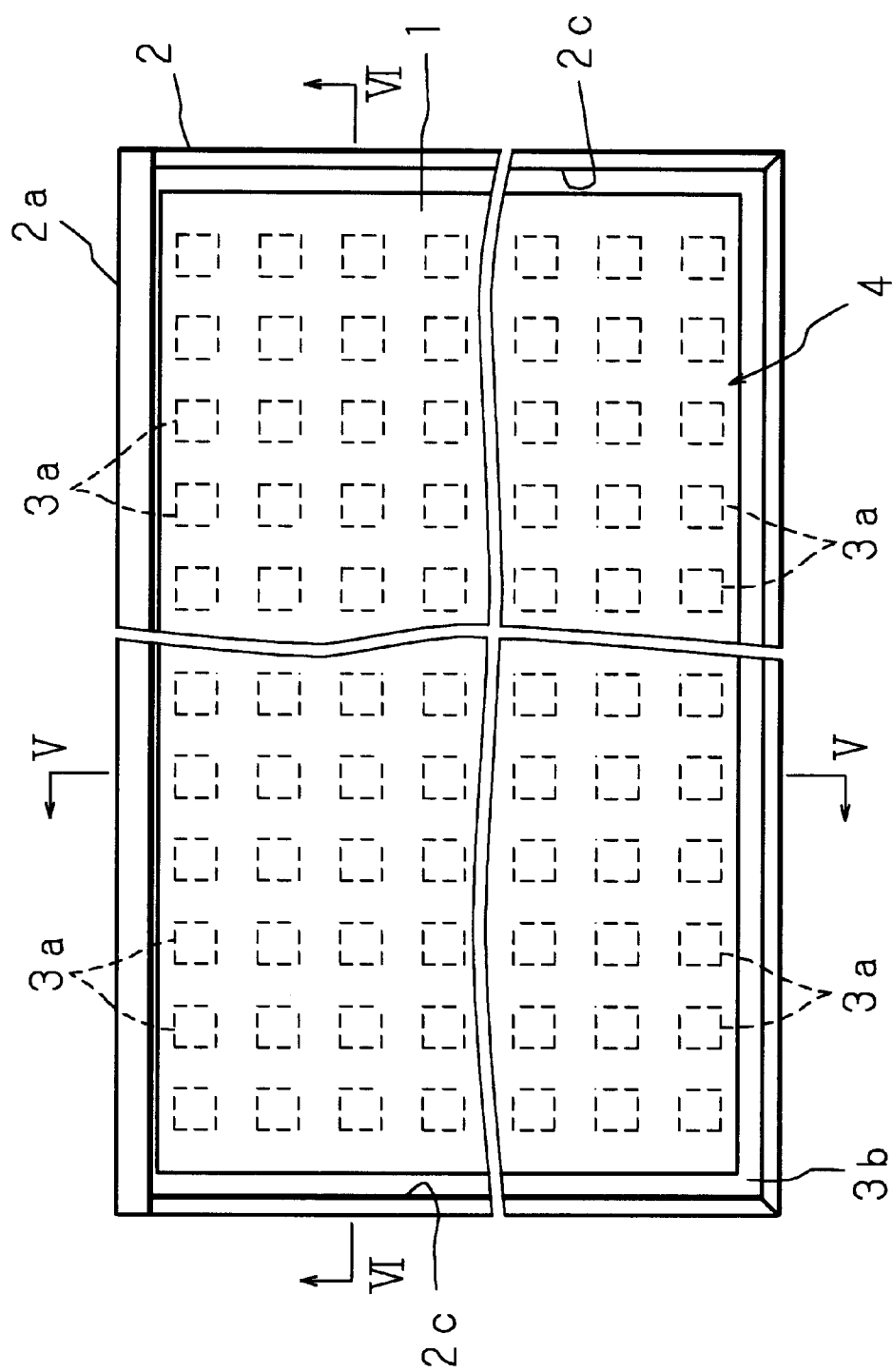
FIG. 4 is a light-incident side plan view showing the structure of a solar cell module according to the first embodiment of the present invention.
Figure 5:
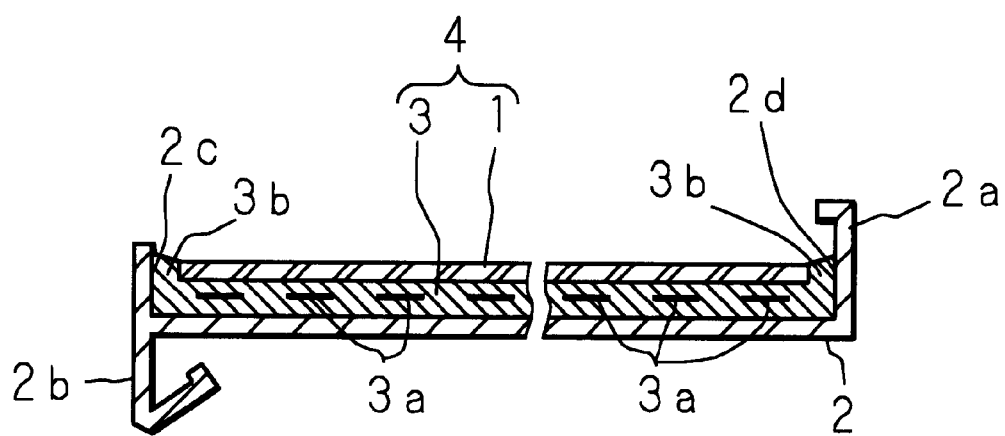
FIG. 5 is a cross section cut along the V—V line of FIG. 4.
Figure 6:
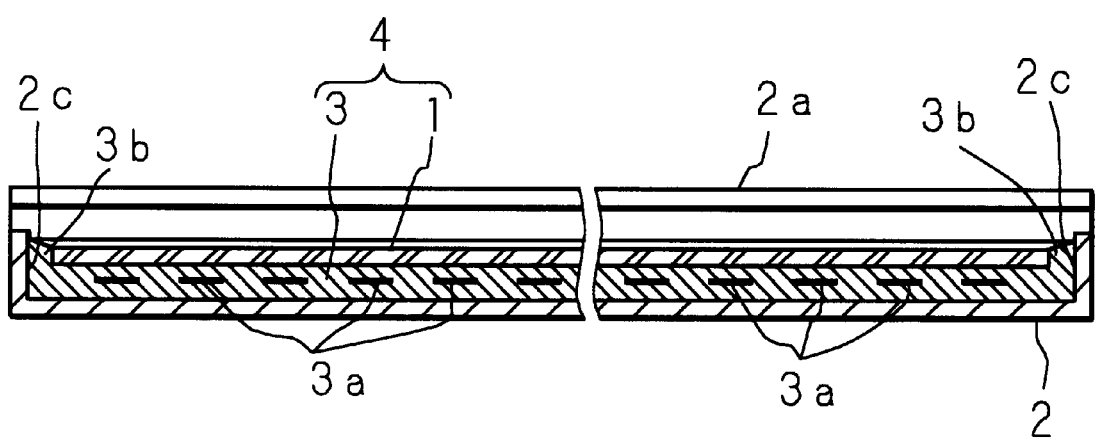
FIG. 6 is a cross section cut along the VI—VI line of FIG. 4.

FIG. 4 is a light-incident side plan view showing the structure of a solar cell module according to the first embodiment of the present invention; FIG. 5 is a cross section cut along the V—V line of FIG. 4; and FIG. 6 is a cross section cut along the VI—VI line of FIG. 4.

In these figures, numeral 2 is a sheet-like substrate formed of a steel plate, and this substrate 2 is rectangular when seen in the plan view and has engagement sections 2a and 2b to be engaged with adjacent other solar cell modules on both edges. A seal layer 3 that seals several to several tens pieces of crystalline, amorphous or other type of solar cell elements 3a, which are arranged on the same plane and wired in series or in parallel, with a synthetic resin 3b formed of a synthetic resin such as PVB and EVA to protect them is layered on the substrate 2, and a sheet-like light transmitting member 1 formed of a tempered glass material capable of transmitting light is layered on the seal layer 3, thereby constructing a solar cell module.

The area of the substrate 2 is larger than the area of the bottom face of a layered body 4 constituted by layering the light transmitting member 1 and the seal layer 3. The engagement section 2a on one edge of the substrate 2 is formed in an inverted L shape by designing the one edge of the substrate 2 to have a raised section 2d raised perpendicularly from the substrate 2 and a section located above the layered body 4. In this case, the raised section 2d is arranged to have a height so as not to cause at least the engagement section 2a to come into contact with the light transmitting member 1.

Meanwhile, the engagement section 2b on the other edge of the substrate 2 is formed on the other edge of the substrate 2, and has a suspended portion hanged perpendicularly from the substrate 2 and an L-shaped portion with an end facing the center side. The substrate 2 has a raised section 2c raised perpendicularly from the substrate 2, on the top face of the other edge having the engagement section 2b.

Besides, the substrate 2 has also the raised sections 2c on the top faces of two edges other than the edges having the engagement sections 2a and 2b. The raised sections 2c are arranged to have a height exceeding the thickness of the layered body 4.

The amount of the synthetic resin 3b constituting the seal layer 3 is not less than an amount necessary for sufficiently constructing the layered body 4, and voids formed between the layered body 4 and the raised sections 2d, 2c are filled with an excess of the synthetic resin 3b, so that the end faces of the light transmitting member 1 are covered with the synthetic resin 3b.

According to the solar cell module of the present invention as described above, by filling the void between the engagement section 2a and the end face of the layered body 4, where water is most likely to stay, with the synthetic resin 3b, it is possible to prevent water from staying in the void. Moreover, by filling the void between the raised section 2c on the engagement section 2b side and the layered body 4, with the synthetic resin 3b, it is possible to waterproof the end face of the layered body 4 on the engagement section 2b side which is most easily influenced by wind and rain, prevent infiltration of water into the boundary between the seal layer 3 and the substrate 2 or the light transmitting member 1 and avoid separation at the boundary. Besides, since waterproofing is made using the synthetic resin 3b, there is no need to additionally prepare a waterproof agent. Furthermore, since the raised sections 2c, 2c, 2c or the raised section 2d are arranged to have a height higher the thickness of the seal layer 3, they also perform the function of preventing deformation of the seal layer 3 in a transverse direction.

In the above-described embodiment, the raised sections 2c, 2c, 2c are arranged to have a height equal to or more than the thickness of the layered body 4 so as to increase the contact surface with the synthetic resin 3b, but, if they are arranged to have a height lower than the thickness of the layered body 4, they are arranged to have at least a height higher than the position of the bottom face of the light transmitting member 1 so as to prevent deformation of the seal layer 3 in a transverse direction.

A solar cell device is constructed by installing a plurality of solar cell modules having such a structure in a connected manner from the eave side to the ridge side, for example, so that the engagement section 2a of one of adjacent solar cell modules engages with the engagement section 2b of the other solar cell module.

Next, the following description will explain the moisture resistance characteristics of the solar cell module of the first embodiment of the present invention and a conventional solar cell module.

The solar cell module of the first embodiment of the present invention and the conventional solar cell module were subjected to a moisture resistance test according to JIS C 8917. This moisture resistance test was carried out by leaving the respective solar cell modules in the conditions of a temperature of 85±2° C. and a humidity of 90 to 93±5% continuously for 1000±12 hours and 2000±12 hours. Further, parameters (maximum power Pmax, open circuit voltage Voc, short-circuit current Isc, fill factor F.F.) were measured before and after the test, and the rate of change of these parameters (the percentage of the characteristic before the test/the characteristic after the test) (%) was calculated.

The results are shown in Table 1.

TABLE 1

| | TEST TIME | RATE OF CHANGE OF EACH PARAMETER BEFORE AND AFTER TEST (AFTER TEST/ BEFORE TEST) (%) | | | |
|---|---|---|---|---|---|
| | (HOUR) | Pmax | Voc | Isc | F.F. |
| INVENTED MODULE | 1000 | 99.5 | 99.4 | 100.5 | 99.6 |
| | 2000 | 99.3 | 99.1 | 101.0 | 99.2 |
| CONVENTIONAL MODULE | 1000 | 98.1 | 99.8 | 97.9 | 100.4 |
| | 2000 | 87.0 | 98.0 | 96.0 | 92.5 |

It can be understood from the results shown in Table 1 that the conventional solar cell module maintained its characteristics when it was left in high-temperature and high-humidity environment for around 1000 hours as the JIS standard, but its characteristics were considerably lowered when it was left in high-temperature and high-humidity environment for around 2000 hours. In contrast, it can be understood that the solar cell module of the present invention retained its initial characteristics even when it was left in high-temperature and high-humidity environment for around 2000 hours, and kept the reliability over the long time.

(Second Embodiment)

While the first embodiment illustrates the solar cell module including the engagement sections 2a and 2b on both edges of the substrate 2, the second embodiment explains a solar cell module having no engagement section.

Figure 7:
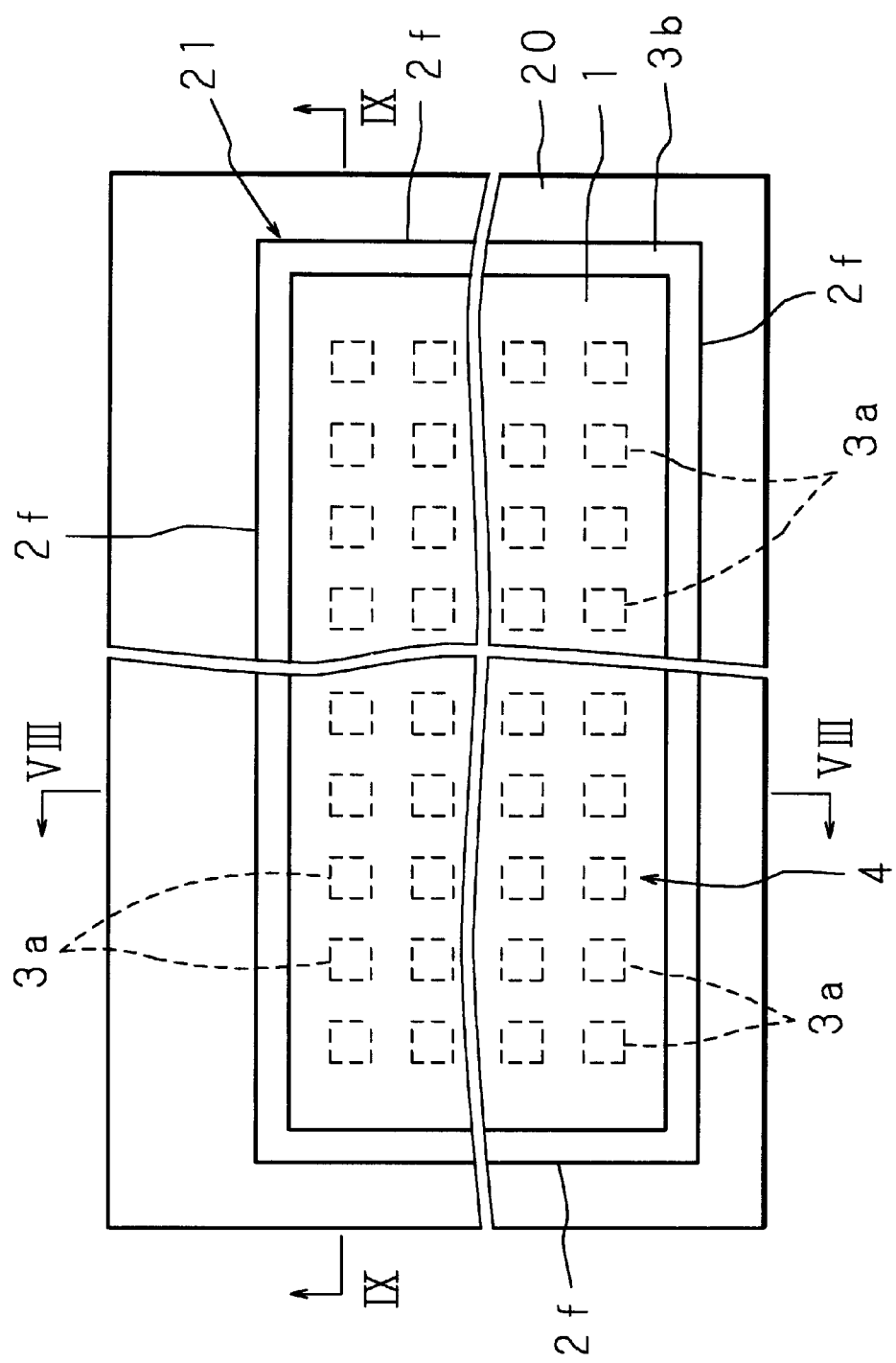
FIG. 7 is a light-incident side plan view showing the structure of a solar cell module according to the second embodiment of the present invention.
Figure 8:
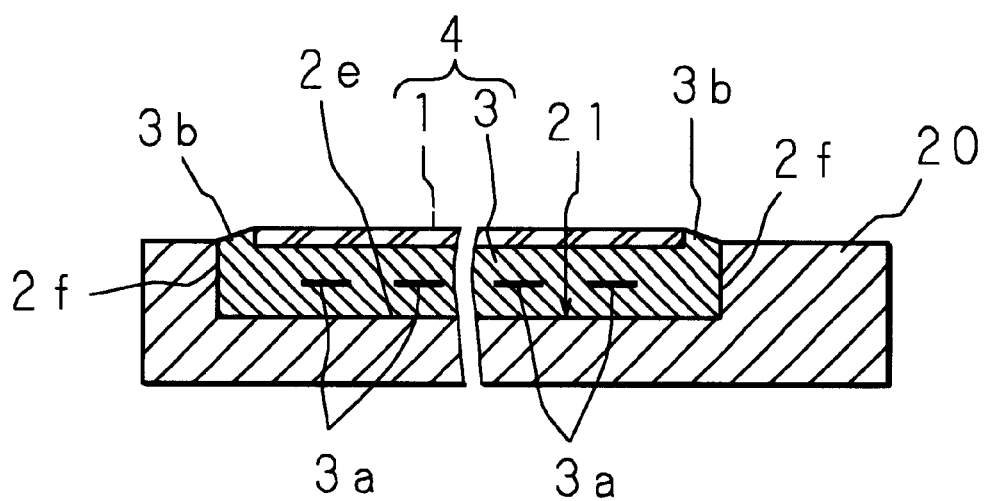
FIG. 8 is a cross section cut along the VIII—VIII line of FIG. 7.
Figure 9:
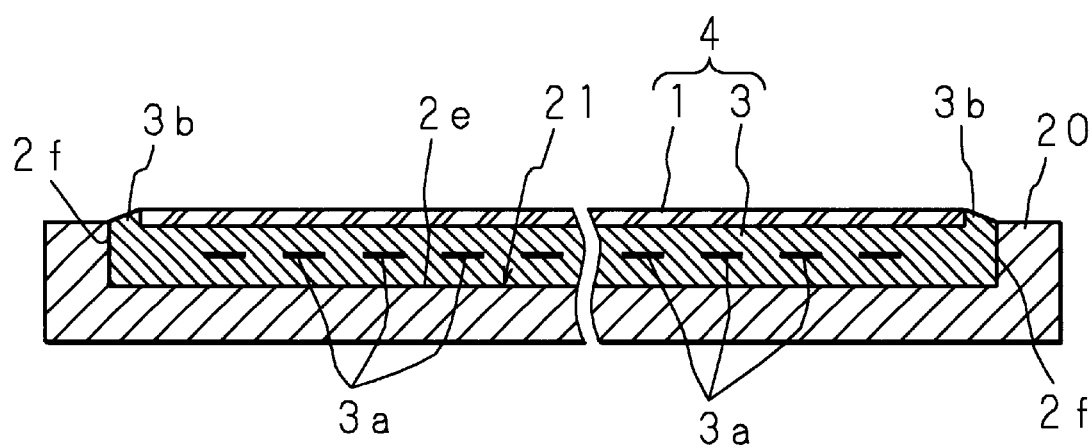
FIG. 9 is a cross section cut along the IX—IX line of FIG. 7.

FIG. 7 is a light-incident side plan view showing the structure of a solar cell module according to the second embodiment of the present invention; FIG. 8 is a cross section cut along the VIII—VIII line of FIG. 7; and FIG. 9 is a cross section cut along the IX—IX line of FIG. 7.

In these figures, numeral 20 is a substrate in the form of a flat plate, and a recessed section 21 which is rectangular when seen in the plan view is formed in the center by raised sections 2f, 2f, formed on the top faces of the four edges of the substrate 2. A seal layer 3 that seals several to several tens pieces of crystalline, amorphous or other type of solar cell elements 3a, which are arranged on the same plane and wired in series or in parallel, with a synthetic resin 3b formed of a synthetic resin such as PVB and EVA to protect them is layered on a bottom face portion 2e of the recessed section 21, and the light transmitting member 1 is layered on the seal layer 3, thereby constructing a solar cell module.

The area of the bottom face portion 2e is larger than the area of the bottom face of a layered body 4 constituted by layering the light transmitting member 1 and the seal layer 3, and the four peripheral raised sections 2f, 2f, . . . are raised perpendicularly from the bottom face portion 2e. The recessed section 21 is designed deeper than the thickness of the seal layer 3, but shallower than the thickness of the layered body 4.

The amount of the synthetic resin 3b constituting the seal layer 3 is not less than an amount necessary for sufficiently constructing the layered body 4, and voids between the layered body 4 and the raised sections 2f, 2f, . . . are filled with an excess of the synthetic resin 3b, so that the end faces of the light transmitting member 1 are covered with the synthetic resin 3b.

According to the solar cell module of the present invention as described above, since the end faces of the layered body 4 are covered with the synthetic resin 3b, it is possible to prevent infiltration of water into the boundary between the seal layer 3 and the substrate 20 or the light transmitting member 1 and avoid separation at the boundary. Furthermore, since waterproofing is made using the synthetic resin 3b, it is not necessary to additionally prepare a waterproof agent. In addition, the raised sections 2f, 2f, . . . also perform the function of preventing deformation of the seal layer 3 in a transverse direction.

Note that, while a tempered glass material in the form of a sheet is used as the light transmitting material in the first and second embodiments, it is also possible to use a plastic film Besides, although the first and second embodiments illustrate solar cell modules using mutually separated individual solar cell elements, the present invention is not necessarily limited to such a solar cell module, and, needless to say, the present invention is also applicable to an integrated type amorphous solar cell module produced by directly forming a plurality of solar cell elements using an amorphous semiconductor adhered onto the light transmitting member serving as the substrate.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A solar cell module comprising:

a sheet substrate made of steel;

a sheet light transmitting member; and a seal layer sealing a plurality of solar cell elements in said seal layer with a synthetic resin, said seal layer being provided between said substrate and said light transmitting member, wherein at least a part of end faces of said light transmitting member is covered with said synthetic resin of said seal layer.

2. The solar cell module of claim 1, wherein said substrate comprises, on its edges, raised sections raised toward a side of said light transmitting member, and voids between said raised sections and the end faces of said light transmitting member are filled with said synthetic resin.

3. A solar cell module comprising:

a sheet substrate made of steel;

a sheet light transmitting member; and a seal layer sealing a plurality of solar cell elements in said seal layer with a synthetic resin, said seal layer being provided between said substrate and said light transmitting member;

wherein at least a part of end faces of said light transmitting member is covered with said synthetic resin of said seal layer;

wherein said substrate comprises, on its edges, raised sections raised toward a side of said light transmitting member, and voids between said raised sections and the end faces of said light transmitting member are filled with said synthetic resin;

wherein said substrate comprises, on its both edges, engagement sections that come into engagement with adjacent other solar cell modules, respectively, and said raised sections are formed on the edges having said engagement sections.

4. The solar cell module of claim 2, wherein said raised sections have a height equal to or more than a thickness of said seal layer.

5. The solar cell module of claim 3, wherein said raised sections have a height equal to or more than a thickness of said seal layer.

6. A solar cell device, wherein a plurality of solar cell modules of claim 3 are connected so that adjacent solar cell modules are engaged with each other by said engagement sections.

7. A solar cell device, wherein a plurality of solar cell modules of claim 5 are connected so that adjacent solar cell modules are engaged with each other by said engagement sections.

* * * * *